US011904599B2

(12) United States Patent
Whiteside et al.

(10) Patent No.: US 11,904,599 B2
(45) Date of Patent: Feb. 20, 2024

(54) CLEANING SYSTEM AND METHOD

(71) Applicant: Absolute Engineering Limited, Skelmanthorpe (GB)

(72) Inventors: Antony Whiteside, Skelmanthorpe (GB); Peter Gallagher, Skelmanthorpe (GB)

(73) Assignee: ABSOLUTE ENGINEERING LIMITED, Skelmanthorpe (GB)

( * ) Notice: Subject to any disclaimer, the term of this patent is extended or adjusted under 35 U.S.C. 154(b) by 0 days.

(21) Appl. No.: 17/917,699

(22) PCT Filed: Apr. 8, 2021

(86) PCT No.: PCT/GB2021/050860
§ 371 (c)(1),
(2) Date: Oct. 7, 2022

(87) PCT Pub. No.: WO2021/205170
PCT Pub. Date: Oct. 14, 2021

(65) Prior Publication Data

US 2023/0150257 A1 May 18, 2023

(30) Foreign Application Priority Data

Apr. 8, 2020 (GB) ..................................... 2005190

(51) Int. Cl.
*B41F 35/00* (2006.01)
*B41F 35/02* (2006.01)

(52) U.S. Cl.
CPC ............ *B41F 35/006* (2013.01); *B41F 35/02* (2013.01); *B41P 2235/14* (2013.01)

(58) Field of Classification Search
CPC ..... B41F 35/006; B41F 35/02; B41P 2235/14
See application file for complete search history.

(56) References Cited

U.S. PATENT DOCUMENTS 5,058,611 A 10/1991 Liers et al.
5,240,506 A 8/1993 Liers et al.
(Continued)

FOREIGN PATENT DOCUMENTS

DE 29918488 U1 12/1999
DE 19902957 A1 8/2000
(Continued)

OTHER PUBLICATIONS

"SONO The World's First On-Press Ultrasonic Anilox Cleaner," Absolute, Nov. 20, 2019, https://thisissono.com/ 4 pages.
(Continued)

*Primary Examiner* — Christopher E Mahoney
*Assistant Examiner* — Marissa Ferguson-Samreth
(74) *Attorney, Agent, or Firm* — Foley & Lardner LLP

(57) ABSTRACT

There is provided a method of cleaning a print roller and a system for performing the same. The method comprises providing an ultrasonic cleaning bar having at least one ultrasonic energy source. The ultrasonic cleaning bar is engaged with an ink-carrying surface of the print roller, the ultrasonic cleaning bar and the ink-carrying surface defining a trough therebetween for containing a cleaning fluid. A cleaning routine is executed, the cleaning routine comprising: filling the trough with the cleaning fluid so that the cleaning fluid contacts the ink-carrying surface; activating the ultrasonic energy source for a period of time to remove contaminants from the ink-carrying surface of the print roller so that the contaminants become suspended in the cleaning fluid; and draining the suspension of cleaning fluid and contaminants from the trough. The method comprises executing the cleaning routine at least two times in succession before cleaning of the print roller is complete.

18 Claims, 8 Drawing Sheets

(56) References Cited

U.S. PATENT DOCUMENTS

| | | | | |
|---|---|---|---|---|
| 5,291,827 A | | 3/1994 | Liers et al. | |
| 5,694,846 A | * | 12/1997 | MacPhee .................. | B41F 7/24<br>101/148 |
| 5,842,418 A | | 12/1998 | Corrado et al. | |
| 6,371,024 B1 | | 4/2002 | Scholzig et al. | |
| 6,907,826 B1 | | 6/2005 | Berg et al. | |
| 8,671,506 B2 | | 3/2014 | Steckmann et al. | |

FOREIGN PATENT DOCUMENTS

| | | | |
|---|---|---|---|
| DE | 10145902 | A1 | 4/2003 |
| DE | 10148401 | A1 | 4/2003 |
| EP | 0 611 651 | A1 | 8/1994 |
| EP | 0 693 378 | A1 | 1/1996 |
| EP | 0 765 749 | A1 | 4/1997 |
| EP | 1 097 813 | A2 | 5/2001 |
| EP | 1 990 693 | A1 | 11/2008 |
| EP | 2 011 653 | B1 | 1/2009 |
| FR | 2794402 | | 12/2000 |
| GB | 2 346 113 | A | 8/2000 |
| GB | 2 417 924 | A | 3/2006 |
| JP | 2011-183369 | A | 9/2011 |
| WO | WO-2011/072681 | A1 | 6/2011 |

OTHER PUBLICATIONS

International Search Report and Written Opinion issued for PCT/GB2018/050643, dated May 28, 2018, 15 pages.

International Search Report and Written Opinion issued for PCT/GB2019/052858, dated Apr. 17, 2020, 21 pages.

International Search Report and Written Opinion issued for PCT/GB2021/050860, dated Jul. 12, 2021, 12 pages.

Search Report issued for UK Patent Application No. GB1816441.8, dated Apr. 5, 2019, 5 pages.

Search Report issued for UK Patent Application No. GB1816441.8, dated Jun. 25, 2020, 4 pages.

Search Report issued for UK Patent Application No. GB2005190.0, dated Sep. 21, 2020, 2 pages.

SONO Brochure; Absolute Engineering Ltd. 2018, 2 pages.

* cited by examiner

CLEANING SYSTEM AND METHOD

CROSS-REFERENCE TO RELATED APPLICATIONS

The present application is a National Stage of PCT Application No. PCT/GB2021/050860, filed Apr. 8, 2021, which claims priority from United Kingdom Patent Application No. 2005190.0, filed Apr. 8, 2020. The contents of these applications are hereby incorporated by reference in their entirety.

The present invention relates to method of cleaning a print roller using an ultrasonic cleaning bar and a system for providing the same.

Printing is the process of transferring an image onto a substrate using ink. In gravure printing, a roller engraved with an image to be printed is partially immersed in a quantity of ink and rotated. The ink collects in the engraved parts of the roller. Excess ink is scraped away by a doctor blade as the roller rotates, so that only the ink within the engraved parts of the cylinder remains. Once the excess ink has been scraped away, the roller is brought into contact with a substrate, for example paper. The substrate is typically pressed against the cylinder using a pressure roller positioned on an opposite side of the substrate to the cylinder. The ink contained in the engraved parts of the cylinder is transferred onto the substrate to form the image. In flexographic printing, ink is transferred to a fountain roller by at least partially submerging the fountain roller in a quantity of ink or by using an ink chamber having doctor blades. The fountain roller transfers ink to an anilox roller, which comprises a matrix of identical cells engraved onto its outer surface. As the anilox roller rotates, excess ink is scraped away using a doctor blade such that only the ink within the cells remains. The anilox roller transfers the ink to a print roller, which is engraved with the imaged desired to be printed. The print roller contacts a substrate to transfer the image onto the substrate. Typically, the substrate is typically pressed against the print roller using an impression roller on an opposite side of the substrate to the print roller.

The volume of ink in the engraved parts of the image carrying rollers must be precisely controlled so as to ensure consistent print quality. Over time, however, dried ink builds up within the engraved parts of the rollers. The dried ink acts to reduce the volume of the engraved parts of the rollers, which degrades the quality of the printed image. For example, the printed image may appear fainter, the image may be the wrong colour, or the edges of the printed image may be less precise. It is known to mitigate this problem by cleaning the engraved rollers so as to remove the dried ink. Known cleaning processes require that the engraved roller is removed from the printing machine and immersed in a bath of cleaning fluid containing a surfactant. In some cleaning processes, transducers are used to induce ultrasonic waves within the cleaning fluid which acts to loosen the dried ink from the surface of the engraved roller.

However, removing a roller from a printing machine is a complex task which requires detailed knowledge of the operation of the printing machine and as such can only be performed by skilled workers. The rollers may be up to around 3 m in length and may weigh up to 1 tonne, and thus specialist lifting machinery may be required to remove the roller which adds additional expense to the cleaning process. Furthermore, depending upon the complexity of the printing machine, the amount of down time required to remove a roller to be cleaned may be relatively long, often taking an hour or more. This problem is compounded for full colour printing machines, which typically comprise seven or more rollers that require cleaning. The printing machine cannot be used to generate revenue whilst it is being cleaned, and therefore cleaning of the engraved rollers is relatively expensive in terms of lost revenue. In addition, removing the engraved roller from the printing machine runs the risk that it will be damaged and must therefore be replaced.

It is preferable to empty the bath between each cleaning operation so that subsequent cleaning operations can be performed with fresh cleaning fluid. However, the amount of cleaning fluid contained in the bath is typically significantly greater than the volume of the roller itself. Each cleaning operation therefore consumes a large quantity of cleaning fluid which is environmentally wasteful. Furthermore, because the volume of the bath is relatively large, the ultrasonic waves induced in the cleaning fluid dissipate and lose strength before they are reflected from the surface of the roller being cleaned. As such, the cleaning operation is typically not able to remove all of the dried ink from the roller. The cleaning operation is therefore inefficient in terms of time taken, dissipation of ultrasonic energy and consumption of cleaning fluid.

In some flexographic printing machines, cleaning fluid can be fed to the ink chamber in place of the ink to be printed. The cleaning fluid contacts the surface of the roller to be cleaned and removes dried ink. However, this requires that the ink chamber is emptied, often causing ink to be wasted. Furthermore, in such machines the cleaning fluid is continuously circulated through the ink chamber (that is to say, the cleaning fluid is supplied to the ink chamber at the same rate that it is removed from the ink chamber). However, continuously circulating cleaning fluid through the ink chamber results in a large amount of cleaning fluid being used which is environmentally wasteful.

It is an object of the invention to obviate or mitigate the problems associated with prior art systems for cleaning rollers of printing machines, whether identified herein or elsewhere. It is a further object of the invention to provide an alternative and/or environmentally friendly system for cleaning rollers of printing machines.

According to a first aspect of the invention, there is provided a method of cleaning a print roller, comprising:

- providing an ultrasonic cleaning bar having at least one ultrasonic energy source;
- engaging the ultrasonic cleaning bar with an ink-carrying surface of the print roller, the ultrasonic cleaning bar and the ink-carrying surface defining a trough therebetween for containing a cleaning fluid;
- executing a cleaning routine, the cleaning routine comprising: filling the trough with the cleaning fluid so that the cleaning fluid contacts the ink-carrying surface;
- activating the ultrasonic energy source for a period of time to remove contaminants from the ink-carrying surface of the print roller so that the contaminants become suspended in the cleaning fluid; and draining the suspension of cleaning fluid and contaminants from the trough;
- wherein the method comprises executing the cleaning routine at least two times in succession before cleaning of the print roller is complete.

When the trough is filled with cleaning fluid and the ultrasonic energy source is activated, ultrasonic oscillations are generated within the cleaning fluid. The oscillations of the cleaning fluid mechanically vibrates solid contaminant matter that has dried onto the surface of the print roller. The vibrations cause the contaminant matter to break up and detach from the ink-carrying surface.

It has been found that if the cleaning routine is run at least two times in succession the cleaning process is improved significantly. In particular, when the first cleaning routine is executed, relatively large particles of contaminant are removed from the ink-carrying surface. When these large particles are suspended in the cleaning fluid, they act to dampen the ultrasonic oscillations and prevent smaller particles from being removed. Additionally, if too many contaminant particles are removed, the cleaning fluid can become saturated making it more difficult to hold further contaminant particles in suspension even if the period of time that the ultrasonic energy source is activated is prolonged. However, when the cleaning fluid containing the contaminants is drained and replaced with new, contaminant-free cleaning fluid, the ultrasonic vibrations are not dampened and the ability of the cleaning fluid to contain a suspension of contaminant particles is maximised. As such, the second cleaning operation is able to more effectively remove smaller contaminant particles from the ink-carrying surface. This is particularly effective for removing particles that are contained at the bottom of the ink cells of an anilox roller. Consequently the use of two cleaning routines is able to better restore the print roller to its original geometry and ensure that every cell has the same volume for containing printing ink. The cleaning process therefore ensures that metering of ink by the print roller is more accurate and the performance of the print roller is improved.

It will be appreciated that because the trough is filled at the start of the cleaning routine and emptied only at the end of the cleaning routine, the fluid in the trough is not continuously replaced. As such, only the volume of fluid necessary to fill the trough is used during each cleaning routine. It has been found that even when the cleaning routine is repeated a number of times, the volume of cleaning fluid required is reduced significantly in comparison to alternative systems in which fluid is continuously replaced during cleaning or where the print roller is entirely submerged in a bath. The reduction in the amount of cleaning fluid conserves water and produces a smaller volume of ink-contaminated waste, and is therefore less environmentally harmful than alternative methods.

The term "print roller" encompasses substantially any roller within a printing system which may require cleaning due to contact with ink. The print roller may be, for example, an anilox roller.

The term "ultrasonic energy source" encompasses substantially any means of generating ultrasonic waves within the cleaning fluid. This may include, for example, an ultrasonic transducer.

The term "ink-carrying surface" encompasses substantially any surface of the print roller that is configured to contact ink and which may have become contaminated. This may include, for example, an outer surface of the print roller, and more particularly a cylindrical outer surface of the print roller. The ink-carrying surface may include concavities, for example in the case of an anilox roller the ink-carrying surface may comprise one or more ink-metering cells.

The term "trough" encompasses a region of space for containing a fluid that is partially defined by the ink-carrying surface and partially defined by the ultrasonic cleaning bar. That is to say, at least one of the surfaces defining the trough is the ink-carrying surface, and the other surface(s) defining the trough is (are) part of the ultrasonic cleaning bar.

The term "contaminants" encompasses any foreign matter that does not form part of the print roller. This primarily encompasses ink from the printing process in which the print roller is used that has solidified on the ink-carrying surface of the print roller. However, other possible contaminants that are removed during cleaning includes, for example dust, dirt, grease or the like.

The term "draining" encompasses removing the suspension of cleaning fluid and contaminants from the ultrasonic cleaning bar such that the ultrasonic cleaning bar is substantially empty.

The term "in succession" encompasses executing the cleaning routine a number of times in a row without using the print roller in a printing operation. That is to say, running the multiple cleaning routines consecutively in such a manner that the print roller is not used in any intermediate processes that would be likely to cause the ink-carrying surface to be contaminated. For example, where the print roller is within a printing machine, the printing machine is not used to perform a printing operation between cleaning routines. Alternatively, if the print roller has been removed from the printing machine and placed on a separate driving apparatus, the print roller is not replaced within the printing machine until all of the cleaning routines are complete.

The method may comprise executing the cleaning routine three times in succession before cleaning of the print roller is complete. In particular, the cleaning routine may be executed only (and not more than) three times in succession before cleaning of the roller is complete. When the cleaning routine is executed three times, even smaller particles of contaminant are removed from the ink-carrying surface of the print roller and the cleaning process is further improved. Generally speaking, increasing the number of times that the cleaning routine is executed increases the amount of contaminant that is removed from the ink-carrying surface, however the increase in the amount of ink removed decreases asymptotally with each additional cleaning routine. It has been found by experimentation that executing the printing routine three times optimises the overall time taken to clean the print roller versus the amount of contaminant that is removed. Nevertheless, in alternative embodiments, the cleaning routine may be executed four, five or more times in succession.

The method may further comprise preventing cleaning fluid draining from the trough whilst the ultrasonic energy source is activated. In particular, the method may further comprise providing an outlet valve to control the flow of fluid leaving the trough, and executing the cleaning routine may comprise maintaining the outlet valve in a closed configuration to prevent cleaning fluid draining from the trough whilst the ultrasonic energy source is activated. When the outlet valve is closed during the cleaning routine, the cleaning fluid captured within the trough is not flowing and therefore the vibrations produced by the by the ultrasonic energy source are better able to permeate through the cleaning fluid to reach the ink-carrying surface of the print roller.

The method may comprise rotating the print roller whilst the cleaning routine is being executed. By rotating the print roller when the cleaning routine is being executed, the area of the ink-carrying surface that is cleaned may be increased.

The period of time may be chosen based upon based upon the angular velocity of the print roller, such that the period of time is at least equal to the amount of time taken for the roller to complete one full rotation. The print roller may be driven by surface contact between a roller driver (comprising, for example, a motor and a drive wheel) rotating at a constant speed. As such, the angular velocity of the print roller will be dependent upon the diameter of the print roller (smaller-diameter print rollers will rotate at a faster angular velocity than larger-diameter print rollers). When the period of time is longer than the amount of time taken for the roller to complete one full rotation, this ensures that the entire surface of the roller is cleaned during the cleaning routine. In alternative embodiments, the period of time may be chosen based upon the amount of time taken for the print roller to complete two, three, four or substantially any number of rotations.

The print roller may be rotated such that the ink-carrying surface has a linear velocity in the range of around 1 $m \cdot min^{-1}$ to around 7 $m \cdot min^{-1}$, more preferably in the range of around 3 $m \cdot min^{-1}$ to around 5 $m \cdot min^{-1}$, or most preferably around 4 $m \cdot min^{-1}$. In some embodiments the print roller may be rotated such that the ink-carrying surface has a linear velocity of up to 10 $m \cdot min^{-1}$. The linear velocity of the ink-carrying surface is the tangential velocity of a point on the ink-carrying surface relative to an axis of rotation, for example a central axis of the print roller. When the print roller is rotating, the ink-carrying surface moves past the trough of the ultrasonic cleaning bar such that only a portion of the ink-carrying surface is in contact with the cleaning fluid at any one time. If the ink-carrying surface is moving too quickly relative to the trough, the portion of the ink-carrying surface being cleaned will not be in contact with the cleaning fluid long enough for the ultrasonic vibrations to shake contaminants loose from the ink-carrying surface. However, if the ink-carrying surface is moving too slowly cleaning may take too long. It has been found that when the linear velocity of the ink-carrying surface is within the ranges specified above the relative velocity of the ink-carrying surface to the though provides enough time for contaminants to be shaken loose as the ink-carrying surface moves past the trough without the cleaning process taking too long.

The period of time may be at least around three minutes. Generally, it is only preferable to start draining the cleaning fluid once the cleaning fluid has become saturated with contaminants. Waiting until the cleaning fluid is saturated ensures that the entire capacity of the cleaning fluid to absorb contaminants is used, and therefore less cleaning fluid is wasted. It has been found by experiment that three minutes is generally the fastest period of time it may take for the cleaning fluid to become saturated with contaminants and therefore it is preferable that the period of time is at least around three minutes. Additionally, for the majority of print rollers, around three minutes is sufficient time to allow the print roller to complete at least one full rotation.

The period of time may be no more than around seven minutes. Generally, the longer that the ultrasonic energy source is activated for, the more contaminants that removed from the ink-carrying surface. However, at some point the cleaning fluid will become saturated with contaminants and the ability of the cleaning fluid to absorb more contaminants is diminished. It has been found by experimentation that increasing the period of time beyond around seven minutes provides little extra benefit as the cleaning fluid is likely to have become saturated by this point. Therefore it is preferable if the period of time is not more than around seven minutes. More preferably, the period of time may be in the range of around three minutes to around seven minutes The period of time may be around five minutes. It has been found by experimentation when the period of time is around five minutes this provides a good balance between allowing the cleaning fluid to become saturated with contaminants but without wasting additional time once the cleaning fluid as become saturated.

The method may further comprise, before the first cleaning routine is executed, attaching the ultrasonic cleaning bar to a printing machine. In addition, the method may comprise, after the final cleaning routine is executed, removing the ultrasonic cleaning bar from the printing machine. That is to say, the ultrasonic cleaning bar may be used in-situ within the printing machine, such that the ultrasonic cleaning bar is only present within the printing machine for the duration of the cleaning operation, and is removed when the printing machine is used for printing. As such, the ultrasonic cleaning bar does not need to be present on the printing machine at all times, and therefore one ultrasonic cleaning be can be used to clean multiple print rollers.

The method may comprise, before the first cleaning routine is executed, removing the print roller from a printing machine and placing the print roller within a driving apparatus. In addition, the method may comprise, after the final cleaning routine is executed, replacing the print roller within the printing machine. That is to say, the print roller may be removed from the printing machine and cleaning away from the printing machine. In some printing machines it may not be possible to attach the ultrasonic cleaning bar to the printing machine and therefore the roller must be removed from the printing machine before it can be cleaned.

The method may comprise monitoring the volume of cleaning fluid in the trough and preventing execution of the cleaning routine if the amount of cleaning fluid is less than a fill volume. When the volume of cleaning fluid in the trough is less than the fill volume, there may not be enough cleaning fluid in the trough to absorb the ultrasonic vibrations from the ultrasonic energy source. Executing the cleaning routine in such circumstances may therefore cause damage to the ultrasonic cleaning bar. By ensuring the fill volume is reached before the cleaning routine is executed, accidental damage to the ultrasonic cleaning bar can be avoided.

The method may further comprise monitoring the volume of cleaning fluid in the trough whilst the cleaning routine is being executed, and introducing cleaning fluid to the trough to compensate for any leakage of cleaning fluid out of the trough whilst the cleaning routine is being executed. During execution of the cleaning routine, some fluid may leak from the trough, for example around any sealing members such as doctor blades or gaskets as the print roller rotates. Introducing new cleaning fluid to the trough may ensure that the amount of cleaning fluid in the trough is equal to or greater than the fill volume when the cleaning routine is being executed. As such, damage to the ultrasonic cleaning bar is avoided.

The method may comprise forming a seal between the ultrasonic cleaning bar and the ink-carrying surface. When a seal is formed between the ink-carrying surface and the ultrasonic cleaning bar this ensures that cleaning fluid leakage out of the trough is minimised.

The method may comprise introducing a surfactant to the cleaning fluid. In some embodiments, the cleaning fluid may comprise a surfactant when it is delivered to the trough.

According to a second aspect of the invention, there is provided a system for cleaning a print roller, comprising:

an ultrasonic cleaning bar having at least one ultrasonic energy source, wherein the ultrasonic cleaning bar is engageable with an ink-carrying surface of a print roller to define a trough therebetween for containing a cleaning fluid;

wherein the system is configured to execute a cleaning routine, the cleaning routine comprising:

filling the ultrasonic cleaning bar with the cleaning fluid so that the cleaning fluid contacts the ink-carrying surface;

activating the ultrasonic energy source for a period of time to remove contaminants from the ink-carrying surface of the print roller so that the contaminants become suspended in the cleaning fluid; and draining the suspension of cleaning fluid and contaminants from the trough;

wherein the system is configured execute the cleaning routine at least two times in succession before cleaning of the print roller is complete.

That is to say, the system executes the cleaning routine at least twice before cleaning of the print roller is complete.

The system may be configured to execute the cleaning routine three times in succession before cleaning of the print roller is complete.

The system may comprise an outlet valve to control the flow of fluid leaving the trough, and wherein executing the cleaning routine comprises maintaining the outlet valve in a closed configuration to prevent cleaning fluid draining from the trough whilst the ultrasonic energy source is activated.

The ultrasonic cleaning bar may comprise the outlet valve. In alternative embodiments, the outlet valve may be a separate component to the ultrasonic cleaning bar (e.g. part of a control unit).

The system may comprise a drive wheel configured to contact the ink-carrying surface of the print roller to cause the print roller to rotate whilst the cleaning routine is being executed.

The period of time may be chosen based upon based upon the angular velocity of the print roller, such that the period of time is at least equal to the amount of time taken for the roller to complete one full rotation. The period of time may be at least around three minutes, and/or or not more than around seven minutes. The period of time may be around five minutes.

The ultrasonic cleaning bar may comprise a fluid sensor configured to detect the presence of cleaning fluid in the trough.

The ultrasonic cleaning bar may define a fill volume, and the fluid sensor may be aligned with the free surface of the cleaning fluid when the cleaning fluid has filled the trough to the fill volume. That is to say, the fluid sensor may be positioned level with the free surface of the cleaning fluid when the trough has been filled to the fill volume. In some embodiments, the trough may, in practice, be filled with more cleaning fluid than the fill volume so that the free surface of the cleaning fluid is above the fluid sensor.

The system may be configured to monitor the volume of cleaning fluid in the trough using the fluid sensor and is further configured to prevent execution of the cleaning routine if the amount of cleaning fluid is less than the fill volume.

The ultrasonic energy source may be positioned between the fluid sensor and the base of the trough. In particular, the ultrasonic energy source may be spaced vertically below the fluid sensor and vertically above the base of the trough. When the ultrasonic energy source is positioned between the fluid sensor and the base of the trough this ensures that the ultrasonic energy source is aligned with the cleaning fluid, and the ultrasonic vibrations permeate into the cleaning fluid. As such, accidental damage to the ultrasonic cleaning bar is avoided.

The system may be configured to monitor the volume of cleaning fluid in the trough whilst the cleaning routine is being executed, and is further configured to introduce cleaning fluid to the trough to compensate for any leakage of cleaning fluid out of the trough whilst the cleaning routine is being executed.

The ultrasonic cleaning bar may comprise a sealing member configured to form a substantially fluid-tight seal against the ink-carrying surface of the print roller. The sealing member may comprise, for example, a doctor blade.

The system may further comprise a driving apparatus configured to support the print roller for rotation when it has been removed from a printing machine, and wherein the system is configured to execute the cleaning routine when the print roller is supported by the driving apparatus.

It will be appreciated that the above advantages and optional features of the first aspect of the invention may apply equally to the second aspect of the invention and vice versa.

Embodiments of the invention will now be described, by way of example only, with reference to the accompanying schematic drawings, in which.

Figure 1:
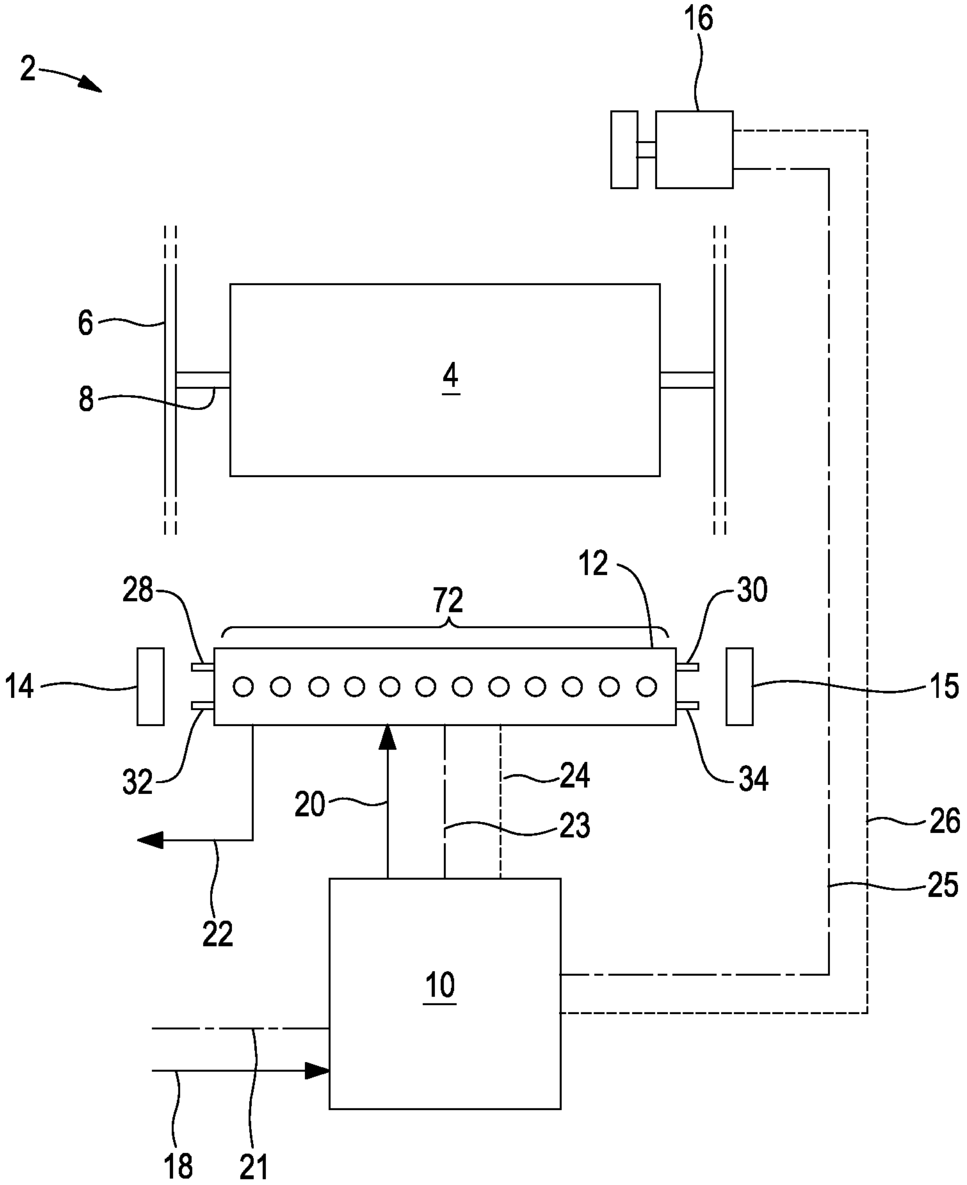
FIG. 1 is a schematic representation of a system for cleaning a print roller.

FIG. 1 shows a cleaning system 2 for cleaning a roller 4 of a printing machine 6. The print roller may be, for example, an engraved roller, and in particular may be an anilox roller. The print roller 4 comprises an axle 8 configured to support the print roller 4 for rotation. The cleaning system 2 comprises a control unit 10, an ultrasonic cleaning bar 12, a first bracket 14, a second bracket 15 and a roller driver 16. The ultrasonic cleaning bar 12 comprises a plurality of ultrasonic energy sources in the form of ultrasonic transducers 72 that are configured to generate ultrasonic vibrations. The control unit 10 receives fluid from a first fluid line 18 and dispenses fluid from a second fluid line 20. The first fluid line 18 is connected to a fluid source, such as, for example, a factory water supply. The ultrasonic cleaning bar 12 receives fluid from the second fluid line 20 and dispenses fluid from a third fluid line 22. The third fluid line 22 removes waste fluid from the ultrasonic cleaning bar 12, and is typically connected to a drain or a factory waste disposal system.

The control unit 10 is connected to an electrical power source by a first power line 21. The ultrasonic cleaning bar 12 is connected to the control unit 10 by a second power line 23 so as to supply electrical power to the ultrasonic cleaning bar 12. The ultrasonic cleaning bar 12 is further connected to the control unit 10 by a first communications line 24 so that the ultrasonic cleaning bar 12 and the control unit 10 may send and receive control signals therebetween. The control unit 10 is connected to the roller driver 16 by a third power line 25 so as to supply electrical power to the roller driver 16. The control unit 10 is further connected to the roller driver 16 by a second communications line 26 so that the roller driver 16 and the control unit 10 may send and receive control signals therebetween. In the illustrated embodiment the control signals sent between the control unit 10, ultrasonic cleaning bar 12 and roller driver 16 are electrical control signals, however the control signals may additionally or alternatively comprise optical or wireless control signals.

Figure 2:
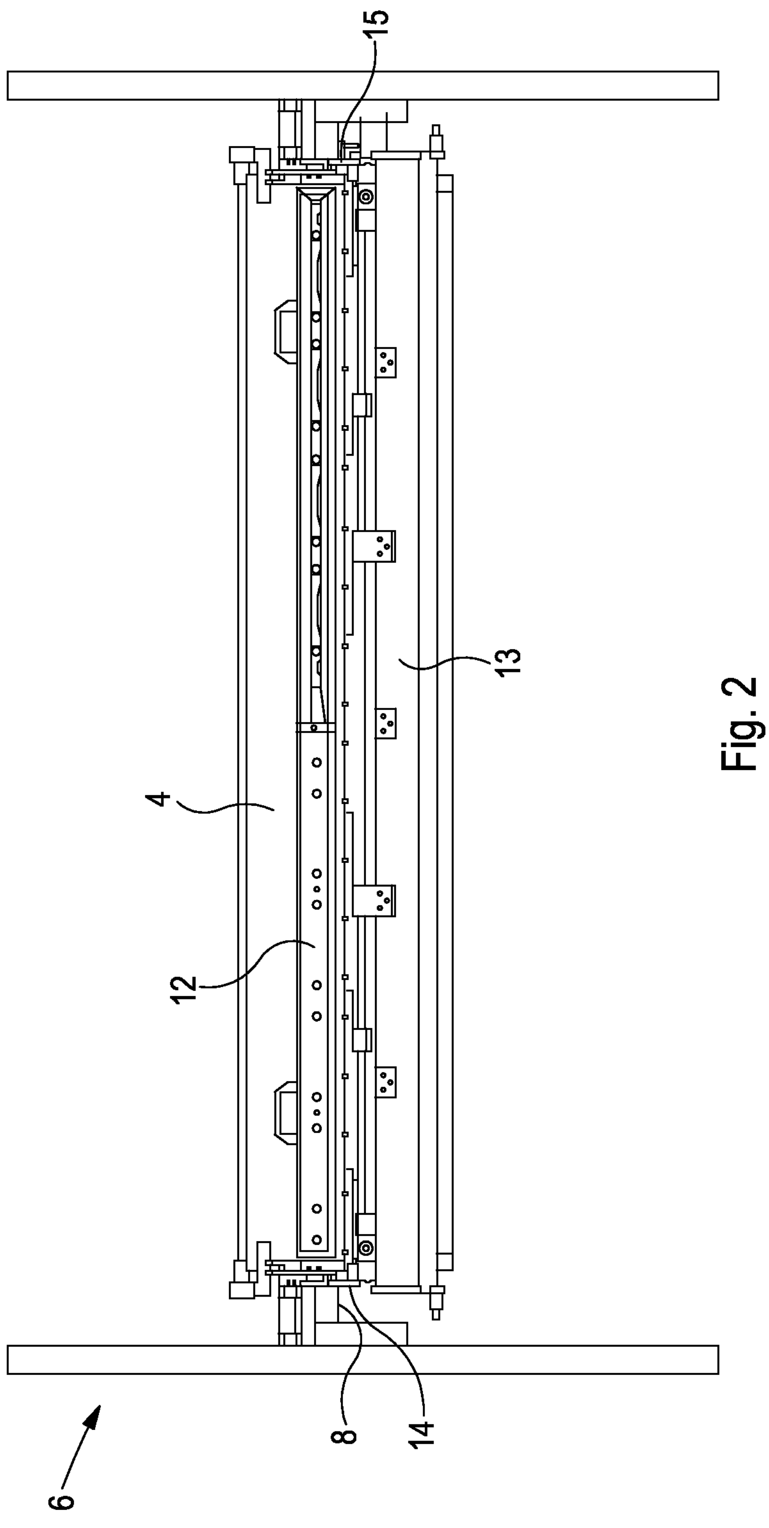
FIG. 2 is a front view of an ultrasonic cleaning bar mounted to a portion of a printing machine.

FIG. 2 shows a side view of the ultrasonic cleaning bar 12 in an assembled state within a printing machine 6. The ultrasonic cleaning bar 12 is generally elongate and defines a longitudinal axis extending generally parallel to the axle 8 of the roller 4. The printing machine 6 further comprises an ink chamber 13. The ink chamber 13 is pivotally mounted within the printing machine 6 so that it can be moved into and out of contact with the roller 4. In the position shown in FIG. 2, the ink chamber 13 has been pivoted away from the roller 4. However, in normal use the ink chamber 13 engages the roller 4 in approximately the same position as the position of the ultrasonic cleaning bar 12 shown in FIG. 2.

With reference to FIG. 1, the ultrasonic cleaning bar 12 comprises a first pin 28, a second pin 30, a third pin 32 and a fourth pin 34. The first and second pins 28, 30 are co-linear and are positioned at longitudinally opposite ends of the ultrasonic cleaning bar 12. Likewise, the third and fourth pins 32, 34 are co-linear and are positioned at longitudinally opposite ends of the ultrasonic cleaning bar 12. The first and second pins 28, 30 are spaced apart from the third and fourth pins 32, 34 in a lateral direction perpendicular to a longitudinal axis of the ultrasonic cleaning bar 12. The first pin 28 and the third pin 32 are configured to be received by the first bracket 14. The second pin 30 and the fourth pin 34 are configured to be received by the second bracket 15. The first and second brackets 14, 15 are mountable to the printing machine 6 either side of the roller 4.

Figure 3:
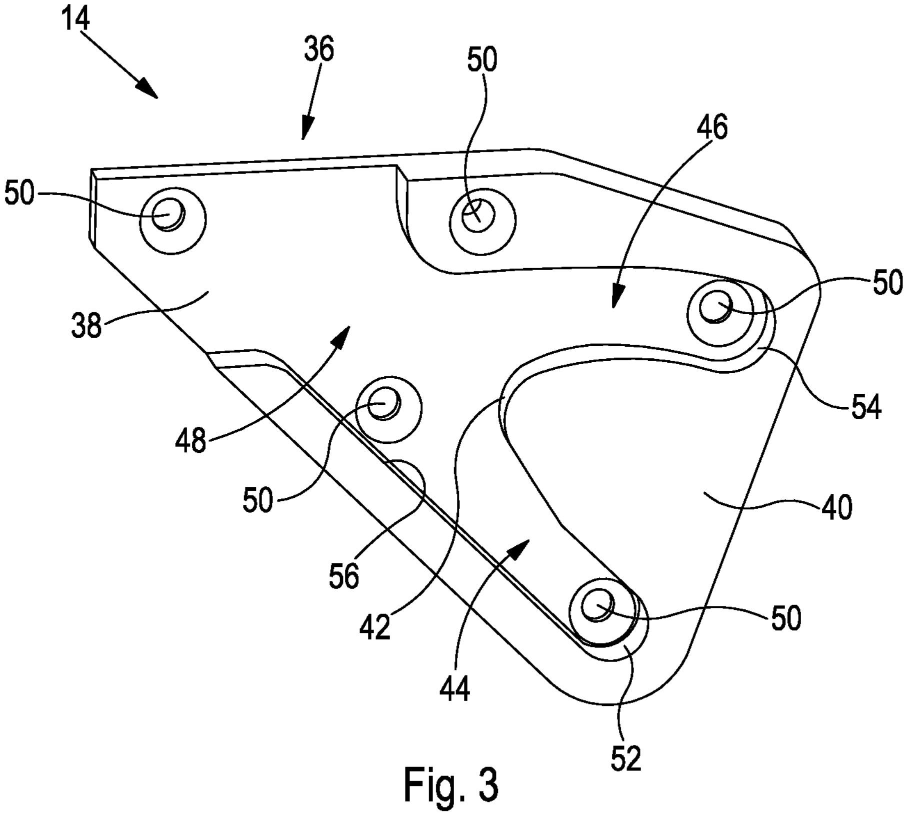
FIG. 3 is a perspective view of a bracket for mounting an ultrasonic cleaning bar to a printing machine.

FIG. 3 shows a perspective view of the first bracket 14. The bracket 14 comprises a rear surface 36, a front surface 38 and a raised surface 40 which are generally co-planar. The front surface 38 and the raised surface 40 are connected by a guide surface 42 which extends in a normal direction relative to the front and raised surfaces 38, 40. The front surface 38, raised surface 40 and guide surface 42 co-operate to define a lower channel 44, an upper channel 46 and a neck region 48. The lower channel 44 terminates in a lower end face 52 defined by the guide surface 42, and the upper channel 46 terminates in an upper end face 54 also defined by the guide surface 42. The lower channel 44 and upper channel 46 are connected by the neck region 48, such that the lower channel 44 and upper channel 46 form a generally U-shaped recess relative to the raised surface 40. The lower channel 44 defines a sloping portion 52 of the guide surface 42 which extends from the neck 48 to the lower end face 52.

The bracket 14 comprises a plurality of mounting holes 50 which are configured to receive fasteners for securing the mounting bracket to a frame of the printing machine 6. The mounting holes 50 comprise countersunk openings configured to receive corresponding countersunk screws, which ensures correct centring of the bracket relative to the frame of the printing machine 6. Different models of printing machine 6 have different frame geometries, and therefore the exact positions of the mounting holes 50 may be chosen in dependence upon the geometry of the printing machine 6.

The second bracket 15 is substantially identical to the first bracket 14, but is mirrored in a plane defined by the raised surface 40. The first and second brackets 14, 15 are mounted to a frame of the printing machine 6 either side of the roller 4. In particular, the brackets 14, 15 are mounted such that the lower and upper channels 44, 46 face generally towards the roller 4 whilst the necks 48 face generally away from the roller 4. During use, the user orients the ultrasonic cleaning bar 12 so that its longitudinal axis extends generally parallel to the axle 8 of the roller 4. The user then slides the third and fourth pins 32, 34 through the necks 48 of the brackets 14, 15 and into the lower channels 44 until the second and fourth pins 32, 34 engage the lower end faces 52. In this position, the first and second pins 28, 30 rest upon the sloping portions 56 of the brackets 14, 15. In this position, the ultrasonic cleaning bar 12 is held in a resting configuration by the brackets 14, 15 in which the ultrasonic cleaning bar 12 is supported by the printing machine 6 but is not in contact with the roller 4. The user then pivots the ultrasonic cleaning bar 12 about the third and fourth pins 32, 34 such that the first and second pins 28, 30 are received within the upper channels 46 and contact the upper end faces 54. In this position, the ultrasonic cleaning bar 12 is held in a cleaning configuration by the brackets 14, 15 in which the ultrasonic cleaning bar 12 engages the roller 4.

The lower and upper channels 44, 46 act to guide the ultrasonic cleaning bar 12 into the resting and cleaning configurations and therefore assist the user when mounting the ultrasonic cleaning bar 12 to the printing machine 6. In particular, the geometries of the lower and upper channels 44, 46 prevent the ultrasonic cleaning bar 12 from being fitted incorrectly. Fitting and removal of the ultrasonic cleaning bar 12 from the printing machine 6 using the brackets 14, 15 is therefore simple and fast. Due to their relatively small size, the brackets 14, 15 may be left in place within the printing machine 6 when the ultrasonic cleaning bar 12 has been removed so as to save time during the next cleaning operation.

Figure 4:
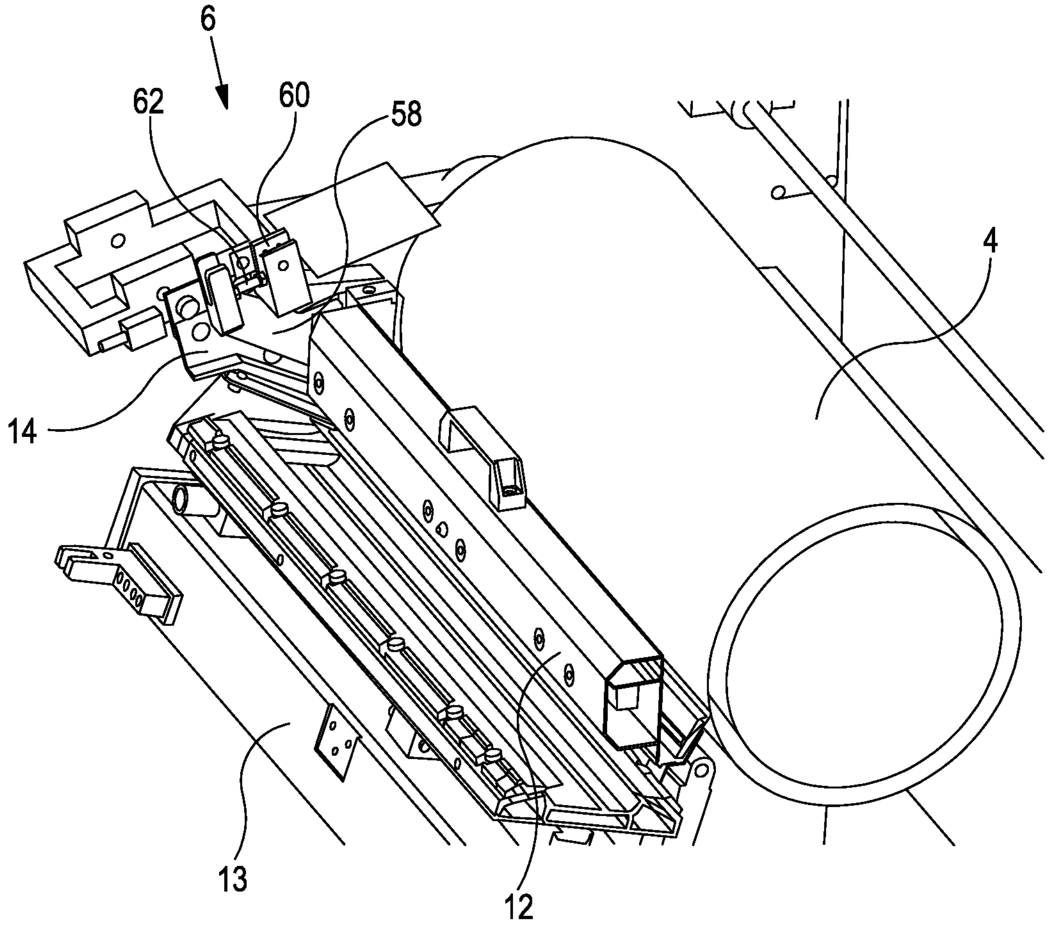
FIG. 4 is a perspective cross-sectional view of an ultrasonic cleaning bar mounted to a portion of a printing machine.

FIG. 4 shows a perspective cross-sectional view of the ultrasonic cleaning bar 12 mounted within the printing machine 6. The ultrasonic cleaning bar 12 further comprises a pair of arms 58 at either end of the ultrasonic printing bar 12 (only one arm 58 is shown in FIG. 4). The arms 58 are configured to engage a frame 60 of the printing machine 6. It will be appreciated that different models of printing machine 6 will have different frame geometries, and therefore the specific shape of the arms 58 will be dependent upon the model of printing machine 6. In the illustrated embodiment, the printing machine 6 is a Göpfert Evolution. Each arm 58 comprises a bolt 62 extending from an end of the arm 58, the bolt 62 being configured to act as a catch to receive a corresponding latch of the printing machine 6. During use, when the ultrasonic cleaning bar 12 is pivoted from the resting configuration to the cleaning configuration, the latch of the printing machine 6 engages the bolt 62 of the arm 58 to hold the ultrasonic cleaning bar 12 in the cleaning configuration. The arm 58 therefore prevents accidental pivoting of the ultrasonic cleaning bar 12 out of the cleaning configuration.

The brackets 14, 15 are manufactured as single integral piece and in particular are manufactured from a polymer such as nylon, polyurethane, polytetrafluoroethylene, or the like. However, it will be appreciated that the brackets 14, 15 may be manufactured from any suitable material. In alternative embodiment, the brackets 14, 15 may not be made from a single integral piece. For example, the rear surface 36 and front surface 38 may be manufactured from a single flat plate, and the raised surface 40 and the guide surface 42 may be manufactured from a block of material that is subsequently attached to the flat plate.

Although the ultrasonic cleaning bar 12 described above comprises pins 28, 30, 32, 34 which engage the brackets 14, 15, it will be appreciated that in alternative embodiments the ultrasonic cleaning bar 12 may comprise substantially any formation which is able to engage the brackets 14, 15 so as to hold the ultrasonic cleaning bar 12 in the cleaning or resting configuration. For example, such formations may comprise rails configured to be received within grooves. Furthermore, in some embodiments the brackets 14, 15 may be replaced with pins, and the pins 28, 30, 32, 34 of the ultrasonic cleaning bar 12 may be replaced with geometry equivalent to the brackets 14, 15 of the embodiment described above. That is to say, the printing machine may comprise a "male" formation and the ultrasonic cleaning bar may comprise a "female" formation configured to receive the "male" formation.

The ultrasonic cleaning bar 12 may comprise one or more switches configured to detect when the ultrasonic cleaning bar has been mounted to the brackets. For example, a switch may be positioned on one the end of the ultrasonic cleaning bar 12 adjacent one of the formations. The switch may be positioned such that the switch is actuated when the ultrasonic cleaning bar 12 is received by the brackets 14, 15 in the cleaning configuration. The switch may communicate with the control unit 10, and the control unit 10 may be configured to prevent the ultrasonic transducers 72 from being activated and/or the trough 82 from being filled when the switch is not actuated. As such, the switches ensure that the ultrasonic cleaning bar is only filled with cleaning fluid when it is in the correct position in relation to the roller 4.

Figure 5:
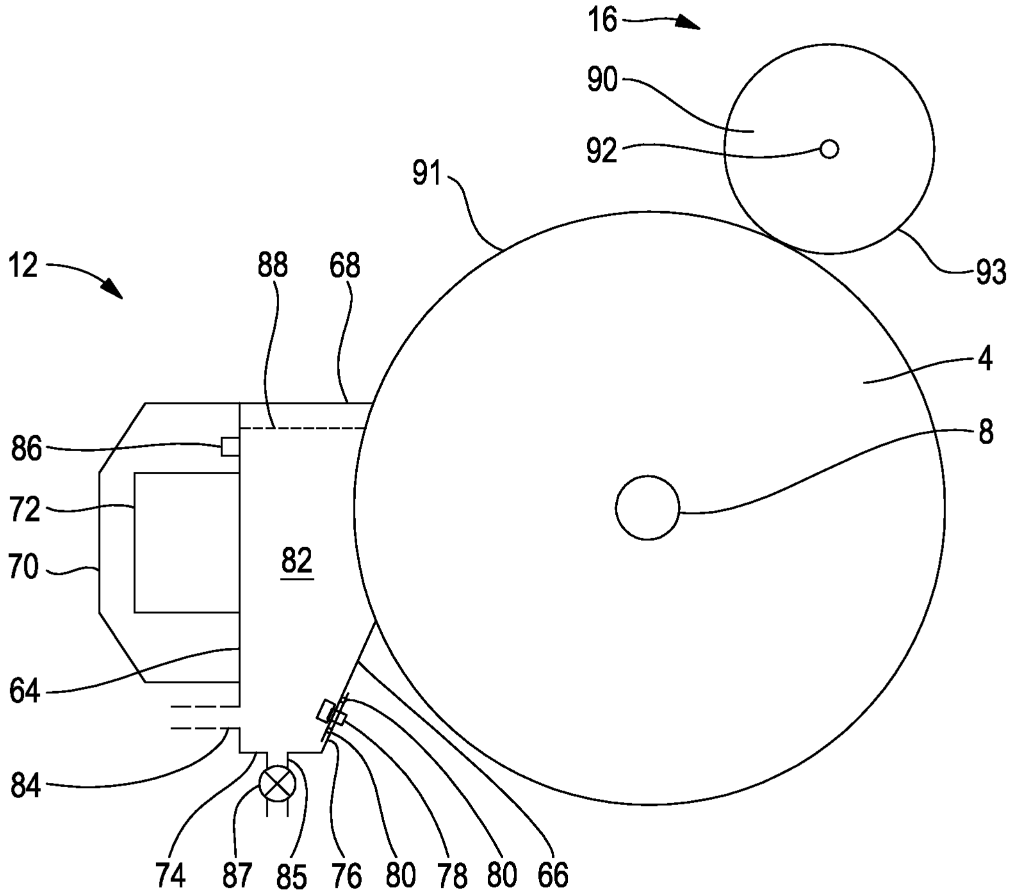
FIG. 5 is a schematic cross-sectional view of a first embodiment of an ultrasonic cleaning bar mounted to a roller of a printing machine.

FIG. 5 shows a schematic cross-sectional side view of the ultrasonic cleaning bar 12 in the cleaning configuration relative to the roller 4. The ultrasonic cleaning bar 12 comprises a body 64, a doctor blade 66, a pair of end caps 68, a cover member 70, and a plurality of ultrasonic transducers 72. The body 64 is generally L-shaped and defines a base 74 having a lip 76. The lip 76 extends upwardly from the base 74, and is inclined at an obtuse angle relative to the base 74. The doctor blade 66 extends generally upwards from the lip 76 so as to form a generally U-shaped channel along the longitudinal axis. The doctor blade 66 is mounted to the lip 76 by a fastener 78. The interface between the doctor blade 66 and the lip 76 is sealed by a pair of gaskets 80 such that fluid cannot leak between the doctor blade 66 and the lip 74. In alternative embodiments substantially any suitable mounting arrangement may be employed to fix the doctor blade 66 to the lip 74 in a fluid tight fashion. The doctor blade 66 engages the roller 4 when the ultrasonic cleaning bar 12 is in the cleaning configuration (as shown in FIG. 5) and forms a fluid tight seal therebetween.

The end caps 68 are positioned at longitudinally opposite ends of the ultrasonic cleaning bar 12. The end caps 68 are mounted to the body 64 and are configured to provide a fluid tight seal between the body 64, the doctor blade 66 and the roller 4. The end caps 68 are generally planar, and define a curved side edge having a corresponding radius of curvature to the roller 4. The end caps 68, body 64 and doctor blade 66 co-operate to define a trough 82 configured to contain a cleaning fluid. The body 64 comprises an inlet port 84 which is connected to the second fluid line 20 which is configured to deliver fluid to the trough 82 and an outlet port 85 and an outlet valve 87 connected to the third fluid line 22. The outlet valve 87 is preferably electronically actuable in response to a control signal from the control unit 10.

The ultrasonic cleaning bar 12 further comprises a level sensor 86 (i.e. a fluid sensor) configured to detect the presence of cleaning fluid within the trough 82. The level sensor 86 is positioned close to the top of the body 64 vertically above the ultrasonic transducers 72. In particular, the position of the level sensor corresponds to the position of the free surface 88 of the cleaning fluid when the trough 82 has been filled to a fill volume. The fill volume is the minimum volume of fluid that the trough 82 should contain before the ultrasonic transducers 72 are activated. The level sensor 86 may be any suitable sensor for detecting the presence of a fluid, for example an ultrasonic sensor, a contact sensor, a float sensor or the like.

During use, when the ultrasonic cleaning bar 12 is in the cleaning position, the system performs a cleaning routine. To begin the cleaning routine, the outlet valve 87 is closed and the trough 82 is filled with cleaning fluid until it reaches the level sensor 86. The cleaning fluid comprises, for example, a mixture of heated water and a surfactant or detergent or the like. When the cleaning fluid reaches the level sensor 86, this indicates that the trough 82 has reached the fill volume. The cleaning system 2 (via the control unit 10) is configured so that the ultrasonic transducers 72 are not activated until the cleaning fluid has been detected by the level sensor 86. Because the level sensor 86 is positioned above the ultrasonic transducers 72, the ultrasonic transducers 72 cannot be activated until they are below the free surface 88 of the cleaning fluid. This ensures that the vibrational energy produced by the ultrasonic transducers 72 is dissipated within the cleaning fluid. If the cleaning fluid is not present, the ultrasonic vibrations will be conducted away from the ultrasonic transducers 72 primarily by the body 64, which may cause damage to the body 64 and/or the ultrasonic transducers 72.

Once the trough 82 has been filled to the fill volume, the ultrasonic transducers 72 are activated for a period of time and the roller driver 16 is activated to begin rotation of the print roller 4. As described above, when the ultrasonic transducers 72 are active, the ultrasonic vibrations permeate the cleaning fluid and dislodge the contaminants from the outer surface 91 of the print roller 4. The surfactant acts to weaken the surface tension between the cleaning fluid and the contaminants, thus enabling the contaminants to be dislodge more easily.

The period of time for which the ultrasonic transducers 72 are active is preferably in the range of around three minutes to around seven minutes, and is more preferably around five minutes. The period of time is preferably chosen to be longer than the length of time it takes for the roller driver 16 to rotate the print roller 4 by one whole rotation.

In some embodiments, the period of time is chosen in dependence upon the volume of the cells of the print roller 4 being cleaned. It has been found that the smaller the volume of the cells, the more difficult it is for the ultrasonic waves to shake contaminant loose from the outer surface 91 and therefore the longer it takes to clean the print roller 4. However, for most commercial print rollers, it has been found that a period of around five minutes provides enough cleaning time even if the cells are relatively small.

Often a small amount of cleaning fluid will leak beyond the end caps 68 and/or the doctor blade 66 when the print roller 4 is rotating. Whilst the ultrasonic transducers 72 are active, the level sensor 86 monitors the volume of fluid in the trough 82. If the free surface 88 drops below the level sensor 86, the cleaning system 2 (via the control unit 10) will supply additional cleaning fluid via the inlet port 84 to compensate for the leaked cleaning fluid.

Once the period of time has elapsed, the cleaning fluid will be saturated with contaminants (i.e. dried ink, dirt, grease or the like) and must be removed from the trough 82. To do so, the outlet valve 87 is opened and the cleaning fluid is emptied from the trough 82 via the outlet port 85. By maintaining the outlet valve 87 as closed during the cleaning operation, the cleaning fluid captured within the trough 82 is not flowing and therefore the vibrations produced by the by the ultrasonic transducers 72 are better able to permeate through the cleaning fluid. Furthermore, because the amount of cleaning fluid used is not more than the volume of the trough 82, and therefore cleaning of the roller 4 can be performed using a relatively small amount of fluid.

Once substantially all of the cleaning fluid has been emptied from the trough 82, the cleaning routine is completed. However, in the majority of cases some contaminant will have remained on the print roller 4. This is because the cleaning fluid becomes saturated with contaminant during the cleaning routine and this can impede the transmission of ultrasonic vibrations to the outer surface 91, thus limiting the removal of further contaminant from the roller 4. Additionally, the cleaning fluid may reach a point where it is no longer possible or it becomes increasingly difficult to hold further particles of contaminant in suspension.

It has been found that if the cleaning routine is repeated at least twice in succession (i.e. without using the print roller 4 for a printing operation between cleaning routines) the cleaning process is improved significantly. In particular, repeating the cleaning routine provides fresh (i.e. uncontaminated) cleaning fluid to the trough 82 which will be more effective at removing contaminant from the print roller 4. Generally speaking, increasing the number of consecutive cleaning routines increases the cleaning performance, however the effect diminishes as the number of cleaning routines increases. It has been found that running the cleaning routine three times consecutively provides a good balance between cleaning performance and the overall length of time taken to clean the roller.

The flow of fluid through the second fluid line 20 to the trough 82 is controlled by control unit 10. In some embodiments, the control unit 10 is configured so that as soon as the level sensor 86 detects the presence of cleaning fluid, fluid flow through the second fluid line 20 is turned off, thus preventing the trough 82 from being over-filled. In alternative embodiments, the control unit 10 may be configured to wait for a predetermined period of time after the level sensor 86 detects the presence of cleaning fluid before turning off fluid flow through the second fluid line 20. This will provide additional cleaning fluid within the trough 82 to account for any accidental leakage during the cleaning operation. In other embodiments, the ultrasonic cleaning bar 12 may comprise a pair of level sensors 86 spaced vertically apart from one another, and the control unit 10 may be configured to ensure that the free surface 88 stays between the two level sensors 86. For example, when an upper one of the level sensors 86 detects the presence of cleaning fluid the fluid flow through the second fluid line 20 may be switched off, and if a lower one of the fluid sensors subsequently detects that the cleaning fluid is no longer present the fluid flow through the second fluid line 20 may be switched on.

The ultrasonic transducers 72 are spaced apart along the longitudinal axis of the ultrasonic cleaning bar 12 (i.e. from left to right in FIG. 2) and are encased by the cover member 70. The ultrasonic transducers 72 may be mounted to the body 64 in any suitable way so that when the ultrasonic transducers 72 are activated, vibrational energy from the ultrasonic transducers 72 is transferred through the body 64 and into the fluid contained in the trough 82. For example, the ultrasonic transducers 72 may each comprise a housing which is mounted to the body 64 by bonding, and may further comprise piezoelectric elements which are secured within the housing by a fastener, such as a bolt. However, substantially any suitable configuration of ultrasonic transducer may be used, provided that ultrasonic energy is can be imparted upon the fluid contained in the trough 82. The body 64 is preferably made from a metal such as stainless steel. It has been found that the use of non-metallic materials such as carbon fibre for the body 64 dampens the ultrasonic vibrations generated by the ultrasonic transducers 72, whereas the use of metal, and in particular stainless steel, in fact promotes resonance of the ultrasonic vibrations thereby enhancing the cleaning effect.

The ultrasonic transducers 72 are positioned so that they are vertically above the doctor blade 66. As such, when the trough 82 is filled with cleaning fluid, there is a large area between the roller 4 between a free surface 88 (i.e. top surface) of the cleaning fluid and the doctor blade 66 in which the cleaning fluid directly contacts the roller 4. During use, the ultrasonic vibrations permeate the cleaning fluid and impinge upon an outer surface 91 (i.e. an ink-carrying surface) of the roller 4. Where the roller 4 is an anilox roller, the outer surface 91 of the roller 4 will comprise a plurality of engraved cells within which may contain dried contaminants, such as for example dried ink, dirt, grease or the like. The ultrasonic vibrations are transmitted into the cells and act to dislodge the contaminants, thus cleaning the roller 4. Preferably, the ultrasonic transducers 72 a primary vibrational frequency which is variable up to 3 kHz, and further harmonic frequencies in the range 18 to 20 kHz and 150 to 180 kHz. Due to the shape of the body 64 of the ultrasonic cleaning bar 12, the ultrasonic transducers are positioned relatively close to the outer surface 91 of the roller 4. Typically, during use the ultrasonic transducers are around 15 to 30 mm away from the outer surface 91 of the roller 4. As such, the amplitude of the ultrasonic vibrations in the cleaning fluid is still strong at the outer surface 91 of the roller 4. As such, the ultrasonic cleaning bar 12 provides improved cleaning of the roller 4.

Preferably, the ultrasonic transducers 72 are spaced apart from one another at regular intervals along the longitudinal axis. For example, the ultrasonic transducers 72 may be spaced apart by around 75 to 150 mm. However, it will be appreciated that in alternative embodiments the ultrasonic transducers 72 may be spaced apart from one another at irregular intervals. The ultrasonic transducers 72 may be operated simultaneously, or may be operated individually in a staggered fashion.

As shown in FIG. 5, the roller driver 16 comprises a drive wheel 90 which is rotatable about an axle 92 under the action of a motor (not shown). The roller driver 16 is mounted to the frame of the printing machine 6 such that an outer surface 93 of the drive wheel 90 frictionally engages an outer surface 91 of the roller 4. In particular, the roller driver 16 may be mounted to the frame of the printing machine 6 via a mounting. The mounting may comprise, for example, a stud attached to the frame of the printing machine 6 and the roller driver 16 may comprise a bracket configured to connect the roller driver 16 to the stud. The mounting is preferably configured to permit the roller driver 16 to move between an engaged position and a rest position. In the engaged position, the drive wheel 90 of the roller driver 16 frictionally engages the outer surface 91 of the roller 4, and in the rest position the drive wheel 90 of the roller driver 16 is not in contact with the roller 4.

However, it will be appreciated that in alternative embodiments the roller driver 16 may be secured in any suitable manner. For example, the roller driver 16 may be mounted to a frame which is independent of the printing machine 6, so as to place the drive wheel 90 in contact with the roller 4. In some embodiments the drive wheel 90 of the roller driver 16 may define a width in the direction of the axle 92 which is relatively narrow in comparison to the roller 4 of the printing machine (such as for example a few centimetres). For example, the drive wheel 90 may have a diameter of around 100 mm and a width of around 20 to 40 mm. In general, it will be appreciated that the roller driver may have any configuration which is suitable for imparting rotation on the roller 4 by frictional contact.

During use, the motor of the roller driver is activated, causing the drive wheel 90 to rotate, and transferring rotational motion to the roller 4 via frictional contact between the outer surface 93 of the drive wheel 90 and the outer surface 91 of the roller 4. As such, the roller 4 rotates relative to the ultrasonic cleaning bar 12 about the axle 8. By rotating the roller 4, different parts of the outer surface 91 of the roller 4 come into contact with the cleaning fluid in the trough 82. The rotation of the roller 4 therefore ensures that the whole surface of the roller 4 is cleaned by the ultrasonic cleaning bar 12 after one full rotation of the roller 4. The roller 4 may be rotated in either direction about the axle 8 without affecting the ability of the doctor blade 66 to seal against the roller 4.

In alternative embodiments, the roller driver 16 may not be present, and instead the printing machine 6 may be operated to rotate the print roller at a desired speed (e.g. using the internal drive components of the printing machine 6). The control unit 10 may communicate with the printing machine 6 to drive the rotation of the print roller 4 at the desired speed.

The outer surface 93 of the drive wheel 90 is coated with a layer of material that is soft in comparison to the material of the roller 4, and which provides good frictional contact with the outer surface 91 of the roller 4. In the present embodiment, the outer surface 93 of the drive wheel 90 comprises a 60 shore hardness rubber, however it will be appreciated that any suitable material may be used, for example a polymer material, a nitrile material, a polyurethane or the like. Because the material of the outer surface 93 of the drive wheel 90 is soft in comparison to the roller 4, this minimises the risk that the drive wheel 90 and roller 4 will damage the outer surface 91 of the roller 4. Furthermore, because the material of the outer surface 93 of the drive wheel 90 provides good frictional contact, this minimises the risk that the drive wheel 90 will slip relative to the roller 4, which may reduce the cleaning performance.

The ultrasonic cleaning bar 12 may be used with rollers 4 of different diameters. When the roller driver 16 is used, the roller 4 is driven by surface contact between the outer surface 93 of the drive wheel 90 and the outer surface 91 of the roller 4, the velocity of the outer surface 91 of the roller 4 is directly controlled by the rotational input of the roller driver 16. As such, for a given rotational speed of the drive wheel 90, the outer surface 91 of the roller 4 will advance past the trough 82 of the ultrasonic cleaning bar 12 at the same rate regardless of the diameter of the roller 4. Therefore, the roller driver 16 provides the advantage that it is able to precisely control the surface velocity of the roller 4 so as to ensure that the roller 4 advances at the correct surface velocity for the cleaning operation. This avoids the need to re-program the control unit 10 when the ultrasonic cleaning system 2 is used with rollers of different sizes (for example, where the ultrasonic cleaning system 2 is used with different models of printing machine).

Figure 6:
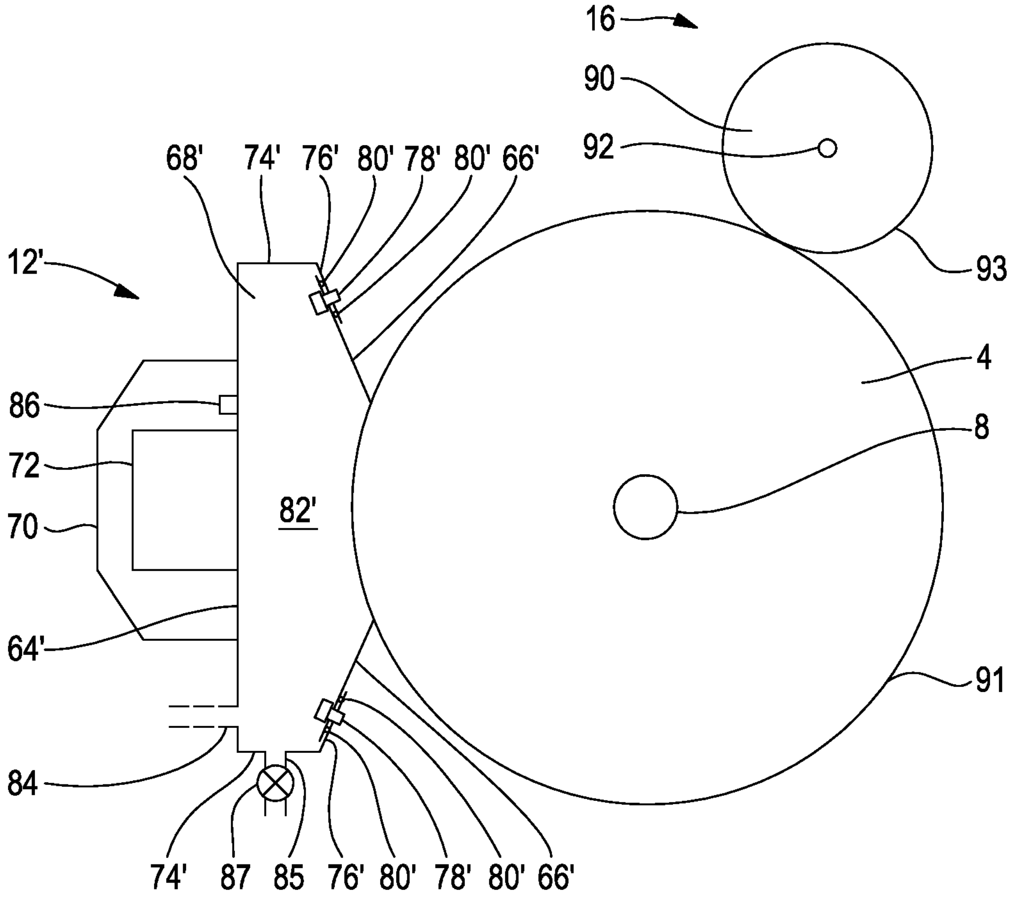
FIG. 6 is a schematic cross-sectional view of a second embodiment of an ultrasonic cleaning bar mounted to a roller of a printing machine.

FIG. 6 shows a second embodiment of an ultrasonic cleaning bar 12' according to the present invention. The second embodiment of the ultrasonic cleaning bar 12' differs from the first embodiment in that the ultrasonic cleaning bar comprises body 64' having a pair of longitudinally extending sides 74'. The sides 74' define a pair of longitudinally extending lips 76'. A lower one of the lips 76' extends generally upwards and a second, opposite, one of the lips 76' is extends generally downwards. The lips 76' support a pair of doctor blades 66' which face towards one another and engage the outer surface 91 of the roller 4. The doctor blades 66' are mounted to the lips 76' via fasteners 78' and sealed by sealing members 80'. The sides 74', lips 76' and doctor blades 66' co-operate to define a trough 82' therebetween. The ends of the trough 82' are sealed by end plates 68' so as to prevent leakage of fluid out of the trough. The trough 82' is therefore sealed on all sides. As such, the trough can be oriented in any direction with respect to gravity, without causing fluid leakage. This is advantageous where the geometry of the printing machine 6 is such that it would not be possible to orient the trough 82 of the first embodiment of the ultrasonic cleaning bar 12 in an upright position.

Figure 7:
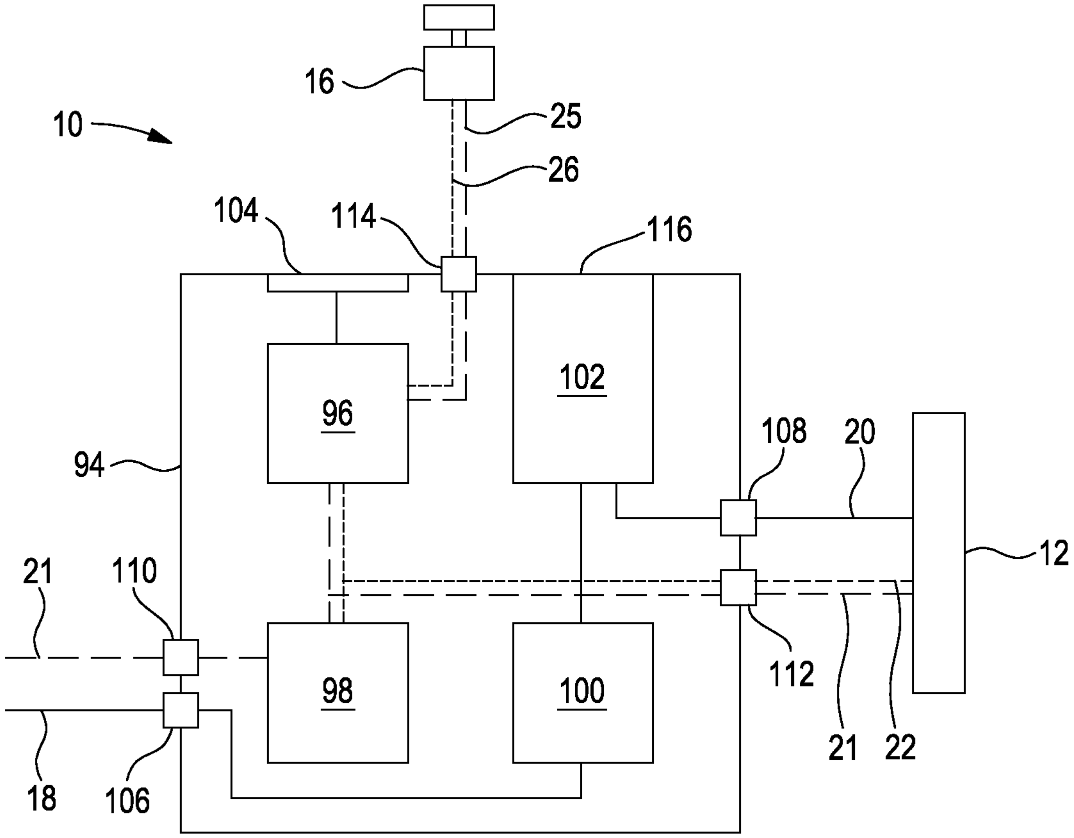
FIG. 7 is a schematic view of a control unit.

FIG. 7 shows a schematic view of a control unit 10 according to the present invention. The control unit 10 comprises a housing 94, a controller 96, a pulse generator 98, a heater 100, a dosing unit 102 and a user input panel 104. The housing 94 comprises a fluid inlet port 106 which is connectable to the first fluid line 18 and a fluid outlet port 108 which is connectable to the second fluid line 20. The housing 94 further comprises a power inlet socket 110 connectable to the first power line 21, a first outlet socket 112 connectable to the second power line 23 and the first communications line 24, and a second outlet socket 114 connectable to the third power line 25 and the second communications line 26.

Fluid is received by the fluid inlet port 106 and is channelled to the heater 100. Movement of the fluid is driven by the pressure of the fluid from the first fluid line 18 (i.e. the pressure of the factory water supply). However, in alternative embodiments the control unit 10 may additional comprise a pump and/or a tank for driving movement of the cleaning fluid. The control unit 10 additionally comprises a valve (not shown) for selectively permitting fluid flow to the second fluid line 20. For example, the valve may be part of or coupled to the fluid inlet port 110 and/or the fluid outlet port 112. The heater 100 is an in-line heater configured to heat the fluid as it moves. However, in alternative embodiments, the heater 100 may comprise a tank having heating elements for heating fluid contained in the tank. The heater 100 is configured to heat the fluid to around 30° C. However, in yet further embodiments the control unit 10 may not comprise a heater 100. In such embodiments, the fluid inlet port 106 may be connected directly to the dosing unit 102.

Once heated, the fluid is passed to the dosing unit 102. The dosing unit 102 introduces a predetermined amount of surfactant into the heated fluid. Typically, the amount of surfactant required is 10 ml per litre of fluid. The temperature of the heated fluid may be chosen so as to ensure that the surfactant will rapidly dissolve into the fluid so that it is evenly dissipated. Furthermore, it has been found that heating the fluid, cleaning performance is increased and dried ink is more easily dislodged. The dosing unit 102 is accessible via a door 116 of the housing 94. The door 116 permits the surfactant in the dosing unit 102 to be refilled once it has been consumed. Once the surfactant has been introduced into the cleaning fluid, the cleaning fluid is channelled out of the control unit 10 via the fluid outlet port 108 and into the trough 82 of the ultrasonic cleaning bar 12.

Electrical power is received by the power inlet socket 110 and is used to power the controller 96 and the pulse generator 98. The controller 98 communicates with the ultrasonic cleaning bar 12 via the first outlet socket 112. In particular, the controller 98 is configured to send and receive control signals from the ultrasonic transducers 72 and the level sensor 86. The controller 96 communicates with the roller driver 16 via the second outlet socket 114 and is configured to activate, deactivate and control the speed of the drive wheel 90 of the roller driver 16. The controller 96 is further configured communicate with the pulse generator 98 and the user input panel 104.

During use, once the user has mounted the ultrasonic cleaning bar 12 to the printer 6, the user inputs a "start" command to the user input panel 104. The control unit 10 then begins to fill the trough 82 with cleaning fluid via the second fluid line 20. The control unit 10 continues to fill the trough 82 until the presence of the cleaning fluid is detected by the level sensor 86. The level sensor 86 communicates that cleaning fluid has been detected to the controller 96, and subsequently the controller 96 shuts off fluid flow to the trough 82 (for example by deactivating the second fluid line 20). The controller 96 communicates with the pulse generator 98 which produces an oscillating electrical power output which drives the ultrasonic transducers 72. The frequency of the electrical power output from the ultrasonic generator 98 is chosen so as to cause the ultrasonic transducers to generate a primary vibrational frequency which is variable up to 3 kHz, and further harmonic frequencies in the range 18 to 20 kHz and 150 to 180 kHz. The control unit 10 then communicates with the roller driver 16 to cause the drive wheel 90 to rotate at a predetermined angular velocity. The roller driver 16 causes the roller 4 to rotate, thereby cleaning the whole surface of the roller 4.

Typically, the roller 4 is driven so that the outer surface 91 of the roller 4 has a surface velocity of around 4 $m \cdot min^{-1}$ (metres per minute), however this speed may be within the range of around 1 $m \cdot min^{-1}$ to around 7 $m \cdot min^{-1}$, or more preferably in the range of around 3 $m \cdot min^{-1}$ to around 5 $m \cdot min^{-1}$. In some embodiments the outer surface 91 may be rotated with a linear velocity of up to 10 $m \cdot min^{-1}$. It has been found that a surface speed of around 4 metres per minute (or within the ranges above) is fast enough that the cells of the roller 4 can be cleaned in a short amount of time, but slow enough to that the cells of the roller 4 are exposed to ultrasonic vibrations for long enough to ensure that contaminant is shaken loose from the outer surface 91 such that the cells are cleaned. At such speeds, activating the ultrasonic transducers 72 for cycles of three to seven minutes, or more preferably five minutes removes enough contaminant from the outer surface 91 to saturate the cleaning fluid. Once the cleaning fluid is saturated, the cleaning fluid can be drained and replaced and a subsequent cleaning routine can be executed.

The control unit 10 continues to drive the ultrasonic transducers 72 and the roller driver 82 until either the user inputs a "stop" command into the user input panel 104, or until a predetermined cleaning period has elapsed. The predetermined cleaning period is chosen so that the whole surface of the roller 4 has been cleaned. In particular, the predetermined cleaning period may be chosen in dependence upon the diameter of the roller 4 and the desired surface speed produced by the roller driver 16 (which may be input into the controller 96 by the user). The predetermined cleaning period may be input by the user, or may selected from a database stored by or associated with the controller 96 of the control unit 10. Typically the predetermined cleaning period is around 5, 10, 15 or 20 minutes. Once the "stop" command is received by the controller 96 or the predetermined cleaning period elapses, the controller 96 deactivates the pulse generator 98 and stops driving the ultrasonic transducers 72. The controller 96 communicates with the ultrasonic cleaning bar 12 and causes the outlet valve 87 of the ultrasonic cleaning bar 12 to open, permitting the cleaning fluid in the trough 82 to empty via the third fluid line 22.

The cleaning system 2 may be used with rollers 4 of different lengths. In order to support the ultrasonic cleaning bar 12 either side of the roller 4, the length of the ultrasonic cleaning bar 12 must be approximately the same as the length of the roller 4. As such, the cleaning system 2 may comprise ultrasonic cleaning bars 12 of various different lengths. However, in order to provide cleaning along the whole length of the roller 4, the ultrasonic transducers 72 should not be spaced apart too far. Therefore, longer ultrasonic cleaning bars 12 will require more ultrasonic transducers 72 in order to provide adequate cleaning. However, it will be appreciated that the pulse generator 96 may only be able to provide sufficient energy to power a number of ultrasonic transducers 72. Typically a single pulse generator 96 is able to supply enough electrical energy to power four pulse generators 96. As such, the control unit 10 may comprise more than one pulse generator 96. For example, the control unit 10 may comprise two, three or any suitable number of pulse generators 96. Where the control unit 10 comprises more than one pulse generator 96, it is able to provide power to ultrasonic cleaning bars 12 having more than four ultrasonic transducers 72.

Figure 8:
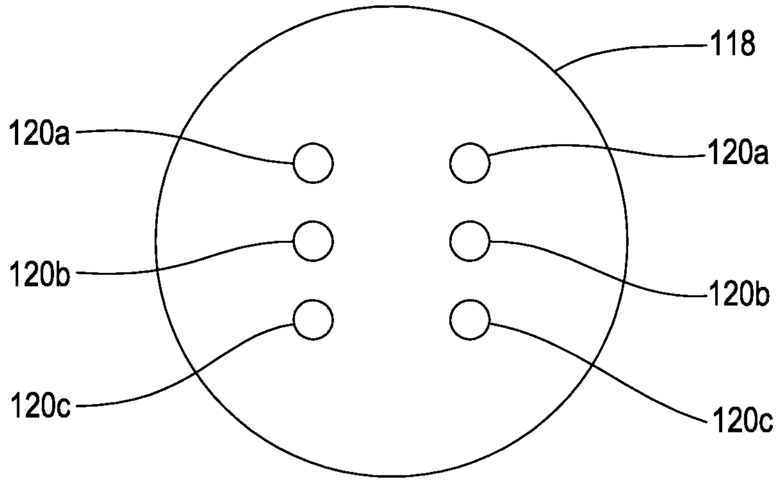
FIG. 8 is a schematic view of a plug for an ultrasonic cleaning bar.

With reference to FIG. 8, each ultrasonic cleaning bar 12 comprises a plug configured to be received by the first outlet socket 112. The plug 120 comprises six electrical contact pins 120*a*-*c* arranged in pairs. The pins 120 are received by corresponding receptacles of the first outlet socket 112 to create an electrical connection therebetween. Each pair of pins 120*a*-*c* comprises a first pin for feeding electrical current from the control unit 10 to the ultrasonic cleaning bar 12 and a second pin for returning the electrical current from the ultrasonic cleaning bar 12 to the control unit 10 (e.g. a "live" pin and a "neutral" pin). Each pair of pins 120*a*-*c* is electrically connected to four ultrasonic transducers 72. Furthermore, each pair of pins 120*a*-*c* is electrically powered by a separate pulse generator 96. For example, a first pair of pins 120*a* is powered by a first pulse generator 96, a second pair of pins 120*b* is powered by a second pulse generator 96 and a third pair of pins is powered by a third pulse generator 96. Because the plug 118 of FIG. 8 comprises three pairs of pins 120*a*-*c*, the plug 118 is able to connect the control unit 10 to an ultrasonic cleaning bar 12 comprising twelve ultrasonic transducers 72 (such as the ultrasonic cleaning bar 12 shown in FIG. 1).

In alternative embodiments each pair of pins 120*a*-*c* may be connected any suitable number of ultrasonic transducers 72, for example one to six ultrasonic transducers. Furthermore, the plug 118 may be used with an ultrasonic cleaning bar comprising fewer than twelve ultrasonic transducers. For example, the plug 118 may be used with an ultrasonic cleaning bar 12 comprising eight ultrasonic transducers 72. However, because each pair of pins 120*a*-*c* powers four ultrasonic transducers 72, all eight ultrasonic transducers 72 can be powered using only the first pair of pins 120*a* and the second pair of pins 120*b*. As such, the plug 118 may be manufactured without the third pair of pins 120*c*, or the third pair of pins 120*c* may be present but electrically disconnected from any other components. The plug 118 is therefore configured to automatically connect the correct number of pulse generators 96 to the ultrasonic transducers 72. This means that the user does not need to make any adjustments to the control unit 10 where the control unit 10 is used with different ultrasonic cleaning bars 12 having different numbers of ultrasonic transducers 72. In practice, the user is able to simply plug any ultrasonic cleaning bar 12 into the control unit 10, as the configuration of the plug 118 will ensure that the correct amount of power is drawn from the control unit 10.

The user input panel 104 may comprise one or more buttons in communication with the controller 96. Additionally or alternatively, the user input panel 104 may comprise a screen, and in particular a touch screen, configured to display a graphical user interface. The user input panel 104 provides a means for the user to adjust the parameters of the cleaning operation, for example the frequency of the electrical pulses generated by the pulse generator 98, the duration of the cleaning cycle itself, the speed of the roller driver 16 etc.

In alternative embodiments, the control unit 10 may comprise additional fluid outlet ports and outlet sockets configured to connect the control unit 10 to additional ultrasonic heating bars 12. As such, the control unit 10 can be used to control a plurality of separate ultrasonic heating bars 12. For example, a user may mount a first ultrasonic heating bar 12 to a first roller 4 of a printing machine 6 and initiate an ultrasonic cleaning cycle. Whilst the first roller 4 is being cleaned, the user may mount a second ultrasonic cleaning bar 12 to a second roller 4 of the same or a different printing machine 6. Once the cleaning cycle of the first roller 4 is complete, the user can use the control unit 10 to initiate the cleaning cycle for the second roller 4. Whilst the second roller 4 is being cleaned, the user can dismount the first ultrasonic cleaning bar 12 and mount it to a third roller 4 of the same or a different printing machine. As such, by using a plurality of ultrasonic cleaning bars 12 the user can save time when cleaning multiple rollers 4.

Although the print roller 4 discussed above is described as remaining in place on the printing machine 6, it will be appreciated that in alternative embodiments the print roller 4 may be removed from the printing machine 6 and placed on a driving apparatus which is separate to the printing machine 6. Where a separate driving apparatus is used, the ultrasonic cleaning bar 12 may be integrated within the driving apparatus. In particular, the ultrasonic cleaning bar 12 may be modified so that it is a permanent part of the driving apparatus (i.e. such that it is not removable using the pins 28, 30, 32, 34). The driving apparatus maybe configured to rotate the print roller 4 relative to the ultrasonic cleaning bar 12 so as to clean the outer surface 91 of the print roller 4 in substantially the same manner as described above with reference to the printing machine 6 and/or the roller driver 16. In some embodiments, the driving apparatus may comprise an axle support for supporting the print roller for rotation about the axle 8, and the roller driver 16.

The invention claimed is:

1. A method of cleaning a print roller, comprising:
providing an ultrasonic cleaning bar having at least one ultrasonic energy source;
engaging the ultrasonic cleaning bar with an ink-carrying surface of the print roller, the ultrasonic cleaning bar and the ink-carrying surface defining a trough therebetween for containing a cleaning fluid; and
executing a cleaning routine, the cleaning routine comprising:
filling the trough with the cleaning fluid so that the cleaning fluid contacts the ink-carrying surface;
activating the ultrasonic energy source for a period of time to remove contaminants from the ink-carrying surface of the print roller so that the contaminants become suspended in the cleaning fluid;
preventing cleaning fluid draining from the trough whilst the ultrasonic energy source is activated; and
draining the suspension of cleaning fluid and contaminants from the trough;
wherein the method comprises executing the cleaning routine at least two times in succession before cleaning of the print roller is complete.

2. The method of claim 1, wherein the method comprises executing the cleaning routine three times in succession before cleaning of the print roller is complete.

3. The method of claim 1, wherein the method comprises rotating the print roller whilst the cleaning routine is being executed.

4. The method of claim 1, wherein the print roller is rotated such that the ink-carrying surface has a linear velocity in the range of around 1 m·min-1 to around 7 m·min-1, more preferably in the range of around 3 m·min-1 to around 5 m·min-1, or most preferably around 4 m·min-1.

5. The method of claim 1, wherein the period of time is at least around three minutes, and/or wherein the period of time is not more than around seven minutes, and/or wherein the period of time is around five minutes.

6. The method of claim 1, wherein the method further comprises, before the first cleaning routine is executed, attaching the ultrasonic cleaning bar to a printing machine; and, after the final cleaning routine is executed, removing the ultrasonic cleaning bar from the printing machine.

7. The method of claim 1, wherein the method comprises, before the first cleaning routine is executed, removing the print roller from a printing machine and placing the print roller within a driving apparatus; and, after the final cleaning routine is executed, replacing the print roller within the printing machine.

8. The method of claim 1, wherein the method comprises monitoring the volume of cleaning fluid in the trough and preventing execution of the cleaning routine if the volume of cleaning fluid is less than a fill volume.

9. The method of claim 1, wherein the method further comprises monitoring the volume of cleaning fluid in the trough whilst the cleaning routine is being executed, and introducing cleaning fluid to the trough to compensate for any leakage of cleaning fluid out of the trough whilst the cleaning routine is being executed.

10. The method of claim 1, wherein the method comprises forming a seal between the ultrasonic cleaning bar and the ink-carrying surface.

11. A system for cleaning a print roller, comprising:
an ultrasonic cleaning bar having at least one ultrasonic energy source, wherein the ultrasonic cleaning bar is engageable with an ink-carrying surface of a print roller to define a trough therebetween for containing a cleaning fluid;
an outlet valve to control the flow of fluid leaving the trough; and
a control unit;
wherein the control unit is configured to execute a cleaning routine, the cleaning routine comprising:
filling the trough of the ultrasonic cleaning bar with the cleaning fluid so that the cleaning fluid contacts the ink-carrying surface;
activating the ultrasonic energy source for a period of time to remove contaminants from the ink-carrying surface of the print roller so that the contaminants become suspended in the cleaning fluid;
maintaining the outlet valve in a closed configuration to prevent cleaning fluid draining from the trough whilst the ultrasonic energy source is activated; and draining the suspension of cleaning fluid and contaminants from the trough;

wherein the control unit is configured to execute the cleaning routine at least two times in succession before cleaning of the print roller is complete.

12. A system according to claim 11, wherein the system is configured to execute the cleaning routine three times in succession before cleaning of the print roller is complete.

13. A system according to claim 11, wherein the period of time is chosen based upon the angular velocity of the print roller, such that the period of time is at least equal to the amount of time taken for the print roller to complete one full rotation.

14. A system according to claim 11, wherein the ultrasonic cleaning bar comprises a fluid sensor configured to detect the presence of cleaning fluid in the trough.

15. A system according to claim 14, wherein the ultrasonic cleaning bar defines a fill volume, and wherein the fluid sensor is aligned with the free surface of the cleaning fluid when the cleaning fluid has filled the trough to the fill volume.

16. A system according to claim 15, wherein the system is configured to monitor the volume of cleaning fluid in the trough using the fluid sensor and is further configured to prevent execution of the cleaning routine if the amount of cleaning fluid is less than the fill volume.

17. A system according to claim 14, wherein the system is configured to monitor the volume of cleaning fluid in the trough whilst the cleaning routine is being executed, and is further configured to introduce cleaning fluid to the trough to compensate for any leakage of cleaning fluid out of the trough whilst the cleaning routine is being executed.

18. A system according to claim 11, further comprising a driving apparatus configured to support the print roller for rotation when it has been removed from a printing machine, and wherein the system is configured to execute the cleaning routine when the print roller is supported by the driving apparatus.

* * * * *